United States Patent
Almeras et al.

(10) Patent No.: US 10,066,338 B2
(45) Date of Patent: Sep. 4, 2018

(54) METHODS AND COMPOSITIONS FOR MODIFYING POLYPROPYLENE-BASED FIBERS

(71) Applicant: Devan Chemicals NV, Ronse-Renaix (BE)

(72) Inventors: Xavier Almeras, Hellemmes (FR); Dirk Luyckx, Oostrozebeke (BE)

(73) Assignee: DEVAN CHEMICALS NV, Ronse-Renaix (BE)

( * ) Notice: Subject to any disclaimer, the term of this patent is extended or adjusted under 35 U.S.C. 154(b) by 601 days.

(21) Appl. No.: 14/425,596

(22) PCT Filed: Aug. 5, 2013

(86) PCT No.: PCT/EP2013/066367
§ 371 (c)(1),
(2) Date: Mar. 3, 2015

(87) PCT Pub. No.: WO2014/037176
PCT Pub. Date: Mar. 13, 2014

(65) Prior Publication Data
US 2015/0252526 A1    Sep. 10, 2015

(30) Foreign Application Priority Data

Sep. 6, 2012 (GB) .................................. 1215927.3

(51) Int. Cl.
| C08L 23/00 | (2006.01) |
| D01F 1/06 | (2006.01) |
| D06P 3/79 | (2006.01) |
| D01F 1/10 | (2006.01) |
| D01F 6/06 | (2006.01) |
| C08L 23/10 | (2006.01) |
| C08L 23/12 | (2006.01) |
| C08L 77/02 | (2006.01) |
| C08L 77/06 | (2006.01) |

(52) U.S. Cl.
CPC ............ D06P 3/794 (2013.01); C08L 23/10 (2013.01); C08L 23/12 (2013.01); D01F 1/10 (2013.01); D01F 6/06 (2013.01); C08L 77/02 (2013.01); C08L 77/06 (2013.01); C08L 2203/12 (2013.01); C08L 2205/03 (2013.01); Y10T 428/249921 (2015.04)

(58) Field of Classification Search
None
See application file for complete search history.

(56) References Cited

U.S. PATENT DOCUMENTS

| 3,312,755 A | 4/1967 | Cappuccio et al. |
| 3,320,334 A | 5/1967 | Bonvicini et al. |
| 3,328,484 A | 6/1967 | Alliot-Lugaz et al. |
| 3,433,853 A | 3/1969 | Earle et al. |
| 3,465,060 A | 9/1969 | Oldham |
| 3,686,848 A | 8/1972 | Miller et al. |
| 4,356,300 A | 10/1982 | Isler et al. |
| 5,140,065 A | 8/1992 | Dalla Torre et al. |
| 5,576,366 A | 11/1996 | Lyondell |
| 5,789,529 A * | 8/1998 | Matsumura .......... C08K 5/0016 524/514 |
| 6,679,754 B2 | 1/2004 | Li et al. |
| 6,846,874 B2 | 1/2005 | Baumert et al. |
| 6,875,520 B2 | 4/2005 | Court et al. |
| 2003/0199635 A1 | 10/2003 | Court et al. |
| 2005/0005372 A1 | 1/2005 | Leggio et al. |
| 2005/0109458 A1 | 5/2005 | D'Herbecourt et al. |
| 2005/0112312 A1* | 5/2005 | Baumert ................. B32B 27/34 428/36.91 |
| 2009/0305591 A1 | 12/2009 | Tajima |

FOREIGN PATENT DOCUMENTS

| CA | 2461389 | 9/2004 |
| CN | 1392887 | 1/2003 |
| EP | 1459885 | 9/2004 |
| JP | 2007/308830 A | 11/2007 |
| WO | WO95/33882 | 12/1995 |
| WO | WO97/47684 | 12/1997 |
| WO | WO2005/103345 | 11/2005 |
| WO | WO2006/056690 | 6/2006 |

OTHER PUBLICATIONS

International Search Report dated Nov. 7, 2013 issued for International PCT Application No. PCT/EP2013/066367.
Search Report dated Mar. 5, 2014 issued for the corresponding UK patent application No. GB 1215927.
Search Report dated Jun. 4, 2013 issued for the corresonding Belgian patent application No. 201200635.
Asiaban et al: "Investigation of tensile properties and dyeing behaviour of various polypropylen/lamine..", 2012, Journal of Applied Polymer Science, 123 (4), p. 2162-2171.
First Office Action issued for the corresponding Chinese Patent Application No. 2013800577455.

* cited by examiner

*Primary Examiner* — Ana Lucrecia Woodward
(74) *Attorney, Agent, or Firm* — K&L Gates LLP

(57) ABSTRACT

The invention provides a process for preparing dyed, polypropylene-based fibers. Polypropylene having a Melt Flow Index of 45 or less is combined with an additive blend to provide the polypropylene-based polymer composition for forming into fibers. The additive blend is a terpolymer of ethylene, acrylic or methacrylic ester and maleic anhydride or glycidyl methacrylate combined with an amine-terminated polyamide, in weight ratio 3:1 to 1:1. Fatty acid monoglyceride may also be used in the polymer composition to further improve dyeability. The polypropylene-based fibers are readily dyeable by contacting the fibers with an aqueous dispersion of a disperse dye, to provide fibers with high color intensity (deep hues) and high dye substantivity and color fastness, without the need to employ temperatures in excess of the atmospheric pressure boiling point of the dye dispersion.

17 Claims, No Drawings

METHODS AND COMPOSITIONS FOR MODIFYING POLYPROPYLENE-BASED FIBERS

CROSS-REFERENCE TO A RELATED APPLICATION AND PRIORITY CLAIM

This application claims the benefit under 35 U.S.C. § 371 to International Application Number PCT/EP2013/066367 filed on 5 Aug. 2013 which claims the priority of United Kingdom Patent Application No. 1215927.3 filed on 6 Sep. 2012 to which priority is also claimed by the present application. The entire disclosures of said applications are incorporated by reference herein for all purposes.

TECHNICAL FIELD

The invention relates to methods and compositions for modification of polypropylene-based compositions for use in fibres for use in yarns, fabrics, textiles or garments and to compositions for use in such methods. The compositions are suitable for blending with polypropylene prior to fibre formation and, when used with the methods of the invention, render the resulting polypropylene-based fibres capable of being reliably dyed with disperse dyes.

BACKGROUND

For most fibres used in the textile industry, such as synthetic fibres based upon polyesters, polyamides, polyacrylates and the like, or natural fibres such as wool and cotton, dyeing may be achieved by contacting fibres with a heated solution or dispersion of the dye, e.g. in a dye bath. Such methods are capable of achieving a strong colour hue and high dye substantivity (i.e. strong bonding of dye to fibres so that the dye has low susceptibility to leaching and transfer during washing). Another suitable method is to print colour onto textile formed from fibres, using a solution or dispersion (i.e. a suspension) of dye as a printing ink or paste.

Polypropylene, as a consequence of its high hydrophobicity, shows little or no affinity for dyes. As a consequence of this characteristic, the dyeing of polypropylene fibres by contacting the polypropylene fibres with dye solution or suspension/dispersion, or by printing, has, in the prior art, resulted in risk of poor dye substantivity, pale colouring and high risk of dye transfer problems.

To address such problems, polypropylene has, in the prior art, been coloured by addition of pigments, such as organic and/or inorganic pigments, to the polypropylene as a bulk melt, prior to fibre formation, so that the pigments are physically entrapped within the polypropylene fibre bodies following re-solidification after fibre formation from the polypropylene melt. Typically, polypropylene fibres may be formed by melt extrusion of the polypropylene. As is common for polymer process methods, the pigments may be provided in the form of a masterbatch blended with polypropylene chips or pellets prior to formation of the melt. The term "masterbatch", as used in this field refers to a composition, usually in the form of solid chips or pellets, having a polymer as a base into which additive(s) may be dispersed and/or dissolved. Pellets of masterbatch are then mixed with polymer chips or pellets and melted together so that the desired additives may be uniformly and homogeneously dissolved and/or dispersed throughout the resulting melt. Usually, the polymer used as base for the masterbatch may be the same polymer or polymer type as the polymer into which the additive(s) are to be blended.

Such a bulk process is only economically viable for large production batches only. This may limit the flexibility in the choice of colours for the resulting fibres and articles made from the fibres.

Hence, there is a need for methods and compositions to modify polypropylene in a manner so that polypropylene fibres may be more capable of being dyed by contacting with dispersions and/or solutions of dyes. In particular, it would be desirable to be able to employ so-called disperse dyes for the dyeing of polypropylene fibres, as such dyes are readily available in deep colours.

The addition of polar polymers, containing acid or basic groups, blended with polypropylene for use as dye substantivity enhancer was described in U.S. Pat. Nos. 3,328,484, 3,433,853, 3,465,060 and 3,686,848. These disclosures relate to polypropylene modified to be dyeable by means of acid or basic dyes.

EP-A-0468519 discloses blending of co-polyamide into melt polypropylene prior to fibre formation in order to render the polypropylene fibres dyeable by means of subsequent contacting with acidic dyes.

International patent publication WO 2006/056690 discloses the use of a thermoplastic composition as an additive to polypropylene, in combination with an antioxidant, for improving dyeability or printability. The thermoplastic composition is described as a graft copolymer containing polyamide blocks, having a functionalised polyolefin backbone selected from copolymers of ethylene maleic anhydride and ethylene (meth)acrylate maleic anhydride. It is disclosed that the resulting, so-called alloys of polyolefin (i.e. polypropylene) and graft copolymer, are for use with polar molecules as inks or dyes.

SUMMARY

One object of the invention, amongst others, is to provide compositions and processes which can be used to provide polypropylene-based fibres which may be reliably died or printed to provide deeply hued colour using aqueous compositions containing disperse dyes. It is particularly an object of the invention to provide such polypropylene fibres which have the strength, flexibility and wear characteristics of prior art fibres but which are also rendered dyeable by means of dispersion dyes. It is also an aim of the invention to provide dyeing processes operable under atmospheric pressure, without need for pressure vessels to increase the boiling point of aqueous dye solutions or dispersions. It is a further object of the invention to provide compositions for and methods for blending polypropylene-based polymer compositions to achieve polypropylene fibres capable of being dyed or printed with disperse dyes from aqueous compositions of such dyes, but without the polymer compositions being too brittle or inflexible so that they cannot be easily spun.

A first aspect of the invention provides a process for preparing dyed polypropylene-based fibres, the process comprising:

i) blending a polypropylene having a Melt Flow Index of 45 g/10 min. or less at 190° C., 2.16 kg with an additive blend to provide a polymer composition, wherein the additive blend consists essentially of:
   a terpolymer selected from: a first terpolymer of ethylene, acrylic or methacrylic ester and maleic anhydride having a maleic anhydride content of at least 2% by weight, a second terpolymer of ethylene, acrylic or methacrylic ester and glycidyl methacrylate having a glycidyl methacrylate content of at least 7% by weight, and mixtures thereof, wherein the terpolymer has a Melt Flow Index of 30 g/10 min. or less at 190° C., 2.16 kg, and an amine-terminated polyamide having a Melt Flow Index of 30 g/10 min. or less at 190° C., 2.16 kg, wherein the weight ratio of terpolymer to amine-terminated polyamide in the additive blend is from 3:1 to 1:1, and wherein the polymer composition comprises from 1% to 10% by weight of the additive blend and from 85% to 99% by weight of the polypropylene, ii) forming polypropylene-based fibres from the polymer composition, and iii) dyeing the polypropylene-based fibres by contacting the fibres with an aqueous dispersion of a disperse dye.

A second aspect of the invention provides a masterbatch composition for use with a polypropylene having a Melt Flow Index of 45 g/10 min. or less at 190° C., 2.16 kg, the masterbatch composition comprising:

i) an additive blend consisting essentially of:
a terpolymer selected from: a first terpolymer of ethylene, acrylic or methacrylic ester and maleic anhydride having a maleic anhydride content of at least 2% by weight, a second terpolymer of ethylene, acrylic or methacrylic ester and glycidyl methacrylate having a glycidyl methacrylate content of at least 7% by weight, and mixtures thereof, wherein the terpolymer has a Melt Flow Index of 30 g/10 min. or less at 190° C., 2.16 kg, and an amine-terminated polyamide having a Melt Flow Index of 30 g/10 min. or less at 190° C., 2.16 kg, wherein the weight ratio of terpolymer to co-polyamide in the additive blend is from 3:1 to 1:1, and ii) optionally, a carrier base miscible with polypropylene.

A third aspect of the invention provides a use of an additive blend consisting essentially of:

a terpolymer selected from: a first terpolymer of ethylene, acrylic or methacrylic ester and maleic anhydride having a maleic anhydride content of at least 2% by weight, a second terpolymer of ethylene, acrylic or methacrylic ester and glycidyl methacrylate having a glycidyl methacrylate content of at least 7% by weight, and mixtures thereof, wherein the terpolymer has a Melt Flow Index of 30 g/10 min. or less at 190° C., 2.16 kg, and an amine-terminated polyamide having a Melt Flow Index of 30 g/10 min. or less at 190° C., 2.16 kg, wherein the weight ratio of terpolymer to amine-terminated polyamide in the additive blend is from 3:1 to 1:1, for rendering polypropylene-based fibres dyeable by contacting the polypropylene-based fibres with an aqueous dispersion of a disperse dye under atmospheric pressure, the use comprising:

blending the additive blend with a polypropylene having a Melt Flow Index of 45 g/10 min. or less at 190° C., 2.16 kg to provide a polymer composition, wherein the polymer composition comprises from 1% to 10% by weight of the additive blend and at from 85% to 99% by weight of the polypropylene, and forming the polypropylene-based fibres from the polymer composition.

A fourth aspect of the invention provides a polypropylene-based fibre, yarn or textile comprising:

from 85% to 99% by weight of a polypropylene having a Melt Flow Index of 45 g/10 min. or less at 190° C., 2.16 kg, and from 1 to 10% of an additive blend consisting essentially of:
a terpolymer selected from: a first terpolymer of ethylene, acrylic or methacrylic ester and maleic anhydride having a maleic anhydride content of at least 2% by weight, a second terpolymer of ethylene, acrylic or methacrylic ester and glycidyl methacrylate having a glycidyl methacrylate content of at least 7% by weight, and mixtures thereof, wherein the terpolymer has a Melt Flow Index of 30 g/10 min. or less at 190° C., 2.16 kg, and an amine-terminated polyamide having Melt Flow Index of 30 g/10 min. or less at 190° C., 2.16 kg, wherein the weight ratio of terpolymer to amine-terminated polyamide in the additive blend is from 3:1 to 1:1.

DETAILED DESCRIPTION

The following features, as set out in relation to the various aspects of the invention are applicable to all aspects of the invention where appropriate. When suitable, combinations of the following features may be employed as part of the invention, for instance as set out in the claims.

Throughout this specification, the term "comprising" or "comprises" means including the component(s) specified but not to the exclusion of the presence of others. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, a composition consisting essentially of a set of components will comprise less than 5% by weight, typically less than 3% by weight, more typically less than 1% by weight of non-specified components. The terms "consist of" or "consisting of" mean: including the components specified but excluding the deliberate addition of other components.

Whenever appropriate, the use of the term "comprises" or "comprising" may also be taken to include the meaning "consist of" or "consisting of", "consists essentially of" or "consisting essentially of".

Where molecular weight is referred to in relation to polymers in this specification, it means number average molecular weight as measured by GPC (gas phase chromatography) in tetrahydrofuran at 25° C. with calibration against polystyrene standards.

The first aspect of the invention provides a process for preparing dyed polypropylene-based fibres. By "polypropylene-based" it is meant that the fibres comprise at least 85% by weight of polypropylene, such as at least 90%, in the polymer composition from which the fibre is formed.

The process of the first aspect of the invention comprises blending a polypropylene with an additive blend to form a polymer composition. The polypropylene suitably has a Melt Flow Index of 45 g/10 min. or less at 190° C., such as from 5 to 45 g/min, say 10 to 40 g/min, measured using a 2.16 kg weight in accordance with ISO 1133 (2011).

Polypropylene suitable for the invention is commercially available and may strongly vary in respect to the degree of tacticity (i.e. extent to which the $CH_3$ side groups of the polymer are located on the same side of the polymer backbone), molecular weight distribution and rheological characteristics. Polypropylene with an isotacticity of 90 or more, such as 95% or more, as measured by proton NMR is of particular use for fibre manufacture and is suitable for the invention.

The additive blend consists essentially of a terpolymer and an amine-terminated polyamide.

The terpolymer is selected from:
a) a first terpolymer of ethylene, acrylic or methacrylic ester and maleic anhydride having a maleic anhydride content of at least 2% by weight,
b) a second terpolymer of ethylene, acrylic or methacrylic ester and glycidyl methacrylate having a glycidyl methacrylate content of at least 7% by weight, and
c) mixtures thereof.

The terpolymer, which may be a mixture of terpolymers, as explained above, has a Melt Flow Index of 30 g/10 min. or less at 190° C., measured using a 2.16 kg weight in accordance with ISO 1133 (2011). Typically, the MFI will be 1 g/10 min or more for suitable terpolymers. The terpolymers suitable for use with the invention may have a molecular weight (number average) from 2000 to 6000 g/mole (Dalton).

The acrylic or methacrylic ester monomer of the terpolymer may be a methyl, ethyl or butyl acrylate or methacrylate, preferably a methyl acrylate or methyl methacrylate, most preferably methyl acrylate.

Suitable terpolymers are commercially available under the trade name Lotader™ supplied by the manufacturer Arkema, sold as a coupling agent for mineral-filled compounds such as flame retardant wires and cables and for use in hot-melt adhesives.

The amine-terminated polyamide has Melt Flow Index of 30 g/10 min. or less at 190° C., 2.16 kg measured using a 2.16 kg weight in accordance with ISO 1133 (2011). Typically, the MFI will be 1 g/10 min or more for suitable amine-terminated polyamides.

Suitably, the amine-terminated polyamide may have a number average molecular weight from 1000 to 5000 g/mol and a melting point of 125° C. or less. The melting point may be measured using differential scanning calorimetry, with a scan rate of 1° C./minute and a sample size of 30 mg, with the DSC peak taken as the melting point. The term polyamide as used herein includes polyamides, co-polyamides and polyetherpolyamides.

Suitable polyamides may be prepared by the polymerisation of a monoamino-monocarboxylic acid, or its equivalent lactam, having at least 2 carbon atoms between the amino and carboxylic acid group. Other suitable polyamides may be formed by polymerisation of substantially equimolar proportions of a diamine which contains at least 2 carbon atoms between the amino groups and a dicarboxylic acid or a monoaminocarboxylic acid, or a lactam as set out above, together with substantially equimolar proportions of a diamine and a dicarboxylic acid. The dicarboxylic acid may be in the form of a functional derivative, such as an ester or acid chloride.

Examples of monoamino-monocarboxylic acids or lactams thereof which are useful in preparing the polyamides include compounds having from 2 to 16 carbon atoms between the amino and carboxylic acid groups, said carbon atoms forming a ring containing the —CO—NH— group in the case of a lactam. Diamines suitable for use in the preparation of the polyamides include the straight-chain and branched-chain alkyl, aryl and alkylaryl diamines. The dicarboxylic acids may be represented by the formula: HOOC—R—COOH where R is a divalent aliphatic or aromatic group containing at least 2 carbon atoms.

Examples of suitable aliphatic acids are sebacic acid, octadecanedioic acid, suberic acid, glutaric acid, pimelic acid and adipic acid.

Examples of polyamides, or nylons as they are also known, include, for example: polyamide-6 (polycaprolactam); 6,6 (polyhexamethylene adipamide); 11,12; 4,6; 6,10 and 6,12 as well as polyamides from terephthalic acid and/or isophthalic acid and trimethylhexamethylenediamine; from adipic acid and m-xylylenediamines; from adipic acid, azelaic acid and 2,2-bis(p-aminophenyl) propane or 2,2-bis-(p-aminocyclohexyl) propane and from terephthalic acid and 4,4'-diaminodicyclohexylmethane. Mixtures and/or copolymers of two or more polyamides may also be used.

Polyamides may be obtained by the ring opening polymerization or polycondensation of the polyamide forming components in the presence of a molecular weight modifier. As molecular weight modifier dicarboxylic acids with from 4 to 20 carbons may be used.

Co-polyamides are polycondensation products of the polyamides.

Suitable co-polyamides may be obtained by polycondensation of a suitable monomer blend, such as a monomer mixture having more than 10% by weight, such as 20% to 40% by weight, units with a linear aliphatic chain with from 8 to 12 carbon atoms.

Such co-polyamides are commercially available, for instance the Platamids™ as supplied by Arkema for use in hot melt adhesives. Co-polyamides, suitable as component for use in the invention may, for instance, be of the nylon type: polycondensation products of monomer mixtures PA6/PA6,6/PA12. These are available with a composition (by weight) for example of roughly 40:20:40 or 40:40:20.

The co-polyamides may comprise the polycondensation products of at least two compounds selected from the group consisting of lactams of 6 to 12 carbon atoms and aminocarboxylic acids of 6 to 12 carbon atoms, and equimolar quantities of a diamine of 4 to 12 carbon atoms and a diprimary carboxylic acid of 6 to 36 carbon atoms. For instance, suitable co-polyamides may comprise the polycondensation products of say 20 to 90% by weight, based on the co-polyamide, of at least one lactam or aminocarboxylic acid of 6 to 12 carbon atoms and say 80 to 10% by weight, of equimolar quantities of a diamine of 4 to 12 carbon atoms and a diprimary carboxylic acid of 6 to 36 carbon atoms.

The quantity of lactam or aminocarboxylic acid in the co-polyamide may suitably be from 20 to 60% by weight of the co-polyamide.

The diamine in the co-polyamide component may be diprimary amine or a disecondary amine, for example piperazine.

The co-polyamide may be a co-polyamide having 20% to 60% by weight of the lactam or carboxylic acid component wherein the lactam or carboxylic acid components comprises a mixture of at least 2 cyclolactams or linear aliphatic aminocarboxylic acids. The lactam or carboxylic acid component may contain from 15% to 60% by weight of 11-aminoundecanoic acid and/or 12-aminododecanoic acid.

The molecular weight distribution of the co-polyamides, in which the individual polyamide segments may be present in ordered form or in a random order, is not particularly important.

Suitable polyetherpolyamides, for use as polyamide of the invention, are the products formed from polycondensation of polyetherdiamines, dicarboxylic acids, dimeric acids and from lactams, such as caprolactam. The polyetherpolyamides may be block copolymers. An exemplary polyetherpolyamide may be formed from the polycondensation of caprolactam, a dimeric acid and a polyetherdiamine such as a Jeffamine™.

Polyetherpolyamides suitable for use as polyamides in the invention are, for example, as set out in U.S. Pat. Nos. 5,140,065 and 4,356,300.

The number average molecular weight for the polyamide is suitably from 1000 to 5000 g/mol, with the polyamide (i.e. polyamide or co-polyamide or polyetherpolyamide) having a melting point of 125° C. or less.

Preferably, the polyamide for use in the invention is specifically a co-polyamide.

In all aspects of the present invention the weight ratio of terpolymer to amine-terminated polyamide in the additive blend is from 3:1 to 1:1, suitably from 2.5:1 to 1:1, more suitably from 2:1 to 1:1, for instance from 1.9:1 to 1.2:1, such as from 1.8:1 to 1.4:1.

Preferably, the terpolymer is the first terpolymer of ethylene, acrylic or methacrylic ester and maleic anhydride having a maleic anhydride content of at least 2% by weight.

More preferably, the terpolymer is the first terpolymer of ethylene, acrylic or methacrylic ester and maleic anhydride having a maleic anhydride content of at least 2% by weight and the amine-terminated polyamide is a co-polyamide.

The polymer composition comprises from 1% to 10% by weight, such as from 2% to 5% by weight of the additive blend and from 85% to 99%, such as from 90% to 98% by weight of the polypropylene. In addition to the polypropylene and the additive blend, the polymer composition may comprise other additives, for instance up to 5% by weight of such additives, conventionally used in polypropylene-based polymer compositions for use in fibre formation, such as antioxidants, stabilisers and the like, such as set out hereinafter or otherwise. The limits set out in accordance with the invention, for inclusion of the additive blend in the polymer composition, and the ratio of the two polymers in the additive blend, are related to the spinnability and dyeability of the of the resulting polymer composition, with values outside the suitable ranges giving either poor dyeability or poor spinnability.

The polymer composition may further comprise fatty acid monoglyceride, wherein the fatty acid is selected from C12 to C18 saturated or unsaturated fatty acids and mixtures thereof. The fatty acid monoglyceride preferably comprises at least 60% by weight of glycerol monostearate. Fatty acid monoglycerides are esters formed by reaction of glycerol and a fatty acid, wherein only one of the three —OH groups of the glycerol is reacted with the fatty acid, the other two —OH groups remaining unreacted. Typically, such fatty acid monoglyceride may be present as up to about 0.001% of the polymer composition of the fibres according to the invention.

The mixing of the additive blend with the polypropylene to form the polymer composition may employ techniques such as roll-milling, mixing in a Banbury type mixer, or mixing in an extruder barrel and the like. The heat history (time at which held at elevated temperature) may be shortened by use of masterbatch pellets pre-blended with polypropylene pellets so as to achieve substantially even distribution of the components of the final melt composition into the mass of polymer, thereby reducing the amount of time needed for intensive mixing at molten temperature.

Alternatively, neat additives, may, for instance, be injected into freshly prepared polymer while the polymer is still molten and after it leaves the polymerization vessel or process train, and may be blended before the molten polymer is chilled to a solid or taken to further processing.

Preferably, the additive blend and any fatty acid monoglyceride are provided in a masterbatch composition as solid pellets, and the solid pellets of masterbatch composition are blended with the polypropylene, also in the form of solid pellets, to provide the polymer composition prior to forming the polypropylene-based fibres from the polymer composition. Typically, following mixing of the solid pellets, the pellets may be melted together to provide a molten polymer composition with may be used for fibre formation with only minimal further blending. This provides a suitable method to give homogeneous dispersion without the polymer composition having to be maintained at elevated temperature for long periods.

The process of the first aspect of the invention comprises forming polypropylene-based fibres from the polymer composition.

The term "fibre" as used herein means a flexible, macroscopically homogeneous body having a high ratio of length to width and having a small cross-section. Fibres may be produced from the polymer composition, in the process of the first aspect of the invention, by any suitable processes known in the art, such as direct profile extrusion.

Melt extrusion processes may be used to for fibres or filaments according to the invention. In accordance with known technology such as continuous filament spinning for yarn or staple fibre, and nonwoven processes such as spunbond production and meltblown production, the fibres or filaments may be formed by extrusion of the molten polymer through small orifices. In general, the fibres or filaments thus formed may then be drawn or elongated to induce molecular orientation and affect crystallinity, resulting in a reduction in diameter and an improvement in physical properties. In nonwoven processes such as spunbonding and meltblowing, the fibres or filaments are directly deposited onto a rough or porous surface, such as a moving flat conveyor and are at least partially consolidated by any of a variety of means including, but not limited to, thermal, mechanical or chemical methods of bonding. It is known to those skilled in the art to combine processes or the textiles from different processes to produce composite textiles which may possess certain desirable characteristics. The invention is also applicable to melt extruded bi- or multi-component fibres, wherein one of the components is a polypropylene-based polymer composition according to this invention.

Spunbond fibre is typically from about 1.1 to about 3.3 decitex per filament. Meltblown fibres may typically have a fibre diameter of less than 15 microns and typically are less than 5 microns, ranging down to the submicron level. The size of the fibre will depend on the end use. For instance, heavier fibres or yarns are often employed for carpet pile in contrast to lighter fibres or yarns used to make clothing apparel and the like. The fibres of the present invention may be, for example, from about 1 to about 150 decitex (where decitex is the weight in grams of 10 km of fibre) or the corresponding yarn made up of a plurality of fibres may have a value of say 500 to 3000 decitex, such as 1000 to 1500 decitex.

Polypropylene fibres may typically be extruded at temperatures up to 260° C., such as from 180° C. to 260° C.

The process of the first aspect of the invention also includes dyeing the polypropylene-based fibres by contacting the fibres with an aqueous dispersion/suspension of a disperse dye.

By "aqueous dispersion" it is meant that the liquid solvent used to dissolve and/or disperse is predominantly water-based, including typically at least 60% by weight of water in the liquid solvent.

There are many commercially available disperse dyes. Dyes are classified based on method of application and, to a lesser extent, on chemical constitution by the Society of Dyers and Colourists. Various disperse dyes may be found in the listing "Dyes and Pigments by Colour Index and Generic Names" set forth in Textile Chemist and Colourist, July 1992, Vol. 24, No. 7, a publication of the American Association of Textile Chemists and Colourists.

Dyes are intensely coloured substances used for the colouration of various substrates, such as paper, plastics, or textile materials. It is believed that dyes are retained in these substrates by physical absorption, by salt or metal-complex formation, or by the formation of covalent chemical bonds. The methods used for the application of dyes to the substrate differ widely, depending upon the substrate and class of dye. It is by application methods, rather than by chemical constitutions, that dyes are differentiated from pigments. During the application process, dyes lose their crystal structures by dissolution or vaporization. The crystal structures may in some cases be regained during a later stage of the dyeing process. Pigments, on the other hand, retain their crystal or particulate form throughout the entire application procedure.

A large number of dyes, with widely differing properties, are therefore necessary because of the great variety of materials to be dyed. On a worldwide basis, it is believed that several thousand different dyes have achieved commercial significance. Generally, dyes have been classified into groups two ways. One method of classification is by chemical constitution in which the dyes are grouped according to the chromophore or colour giving unit of the molecule. A second method of classification is based on the application class of end-use of the dye. The dual classification system used in the colour index (CI) is accepted internationally throughout the dye-manufacturing and dye-using industries. In this system, dyes are grouped according to chemical class with a CI number for each chemical compound and according to usage or application class with a CI name for each dye. Disperse dyes are generally water-insoluble non-ionic dyes typically used for dyeing hydrophilic fibres from aqueous dispersion. Disperse dyes have conventionally been used on polyester, nylon, and acetate fibres, and have not been considered, in the prior art, as sufficiently substantive to polypropylene-based fibres. Preferably, the dyes according to this invention are anthraquinone blue dyes, anthraquinone red dyes, diazo red dyes or nitro yellow dyes.

For example, the present dyes are anthraquinone blue dyes, anthraquinone red dyes or nitro yellow dyes.

For example, the disperse dyes for use with the first aspect of the invention may be anthraquinone dyes.

For instance, suitable dyes include Blue BLF (CI 60766, CI Disperse Blue 120, CI Disperse Blue 77), Blue GLF (CI 60767, CI Disperse Blue 27), Blue BGE-01-200 (CI 61104, CI 668210, CI Disperse Blue 60, CI Disperse Blue 99), Blue R200 (CI 63265), Blue 3RL-02 (CI 63285), Red FBN (CI Disperse Red 60), Red CB (CI 26765), Yellow GWL (CI 10338, CI Disperse Yellow 37, CI Disperse Yellow 42), Yellow CR (CI 40001, CI Direct Yellow 6) or Yellow HLG (CI 58840).

Conventional methods can be employed to dye the fibres resulting from this invention. For instance, the fibres may be dyed in a dye bath using conventional disperse dye techniques. Generally, the dye is applied in the form of a dye solution so that it can be readily applied by dipping the fibre through a trough, for example, containing the dye solution, or by spraying the dye solution onto the fibre, or by using a cascading roll technique. Another technique known in the art is jet dyeing, which permits high-temperature dyeing and impingement of the dye onto the moving fabric through use of a venturi jet system.

The dye solution may also be in the form of a print paste, from which the dyeing is typically conducted by roller printing or screen printing. The fibres can be dyed multiple times using one or more dyeing techniques.

Aqueous disperse dye baths typically may have a pH of from about 2 to about 11, generally between about 2 to about 6 for acid dyes. The pH may be adjusted if desired using a variety of compounds, such as formic acid, acetic acid, sulfamic acid, citric acid, phosphoric acid, nitric acid, sulfuric acid, monosodium phosphate, tetrasodium phosphate, trisodium phosphate, ammonium hydroxide, sodium hydroxide, and combinations thereof. Surfactant can be used to aid in dispersing sparingly water soluble disperse dyes in the dye baths.

Typically, non-ionic surfactants can be employed for this purpose. During the dyeing step, the dye bath may be agitated to hasten the dyeing ratio. The dyeing step can be carried out at a variety of temperatures, with higher temperatures generally promoting the rate of dyeing. Carriers may permit faster dyeing at atmospheric pressure at about, or below 100° C., for instance up to the boiling point of the solution in which the disperse dye is present. The carriers are typically organic compounds that can be emulsified in water and that have affinity for the fibre. Representative examples of such carriers include aromatic hydrocarbons such as diphenyl and methylnaphthalene, phenols such as phenylphenol, chlorinated hydrocarbons such as dichloro- and trichloro-benzene, and aromatic esters such as methyl salicylate, butyl benzoate, diethylphthalate, and benzaldehyde. Carriers are generally removed after dyeing.

Subsequent to dyeing, using a dye mixture with additives above, dry heat may be applied to the fibres at elevated temperatures to cause the dye to penetrate into, and become fixed in, the fibre. The dye fixation step may require exposing the fibre to dry heat, such as in an oven. The temperature can vary up to the melt or glass transition temperature of the fibre. Generally, higher drying temperatures result in shorter drying times.

Typically, the heating time may be from about 1 minute to about 10 minutes. Residual dye may then be removed from the fibres by rinsing.

Preferably, the dyeing of the polypropylene-based fibres is carried out under atmospheric pressure, so that the use of pressurised vessels may be avoided. Pressurised vessels have been used, in the prior art, to increase the boiling point of aqueous disperse dye dispersions/suspensions to improve dyeing by allowing temperatures in excess of 100° C. to be used.

The second aspect of the invention provides a masterbatch composition for use with a polypropylene having a Melt Flow Index of 45 g/10 min. or less at 190° C., 2.16 kg. The masterbatch composition comprises an additive blend consists essentially of a terpolymers or terpolymers blend as set out hereinbefore, and a polyamide as set out hereinbefore.

The weight ratio of terpolymer to co-polyamide in the additive blend, and so in the masterbatch composition, is from 3:1 to 1:1, suitably from 2.5:1 to 1:1, more suitably from 2:1 to 1:1, for instance from 1.9:1 to 1.2:1, such as from 1.8:1 to 1.4:1.

The masterbatch composition optionally has a carrier base miscible with polypropylene. This carrier base may suitably be a polyolefin such as polyethylene or polypropylene, preferably polypropylene of a Melt Flow Index of 45 g/10 min or less. Typically, the masterbatch composition may comprise from 20 to 100% by weight of the additive blend, such as from 40 to 99% say 50 to 98% with the remainder being the carrier base. However, other components may be present in the masterbatch composition.

The masterbatch composition may further comprise from 0.3 to 1% by weight of a fatty acid monoglyceride, wherein the fatty acid is selected from C12 to C18 saturated or unsaturated fatty acids and mixtures thereof. The fatty acid monoglyceride is as set out hereinbefore, and preferably comprises at least 60% by weight of glycerol monostearate.

As already explained, the terpolymer is preferably the first terpolymer of ethylene, acrylic or methacrylic ester and maleic anhydride having a maleic anhydride content of at least 2% by weight. The amine-terminated polyamide is preferably a co-polyamide.

The third aspect of the invention provides a use of an additive blend consisting essentially of the terpolymer (or terpolymers mixture) and the amine-terminated polyamide as set out hereinbefore, for rendering polypropylene-based fibres dyeable by contacting the polypropylene-based fibres with an aqueous dispersion of a disperse dye under atmospheric pressure. The use comprises blending the additive blend with a polypropylene having a Melt Flow Index of 45 g/10 min. or less at 190° C., 2.16 kg to provide a polymer composition, wherein the polymer composition comprises from 1% to 10% by weight, such as 2% to 5% by weight of the additive blend and from 85% to 99%, such as 90 to 98% by weight of the polypropylene, and forming the polypropylene-based fibres from the polymer composition.

Preferably, the terpolymer is the first terpolymer of ethylene, acrylic or methacrylic ester and maleic anhydride having a maleic anhydride content of at least 2% by weight. Preferably, the amine-terminated polyamide is a co-polyamide.

The fourth aspect of the invention provides a polypropylene-based fibre, yarn or textile comprising from 85% to 99% by weight of a polypropylene as set out hereinbefore and having a Melt Flow Index of 45 g/10 min. or less at 190° C., 2.16 kg, and from 2 to 10% of the additive blend consisting essentially of the terpolymers and amine-terminated co-polyamide described in detail above.

The polypropylene-based fibre, yarn or textile preferably has the terpolymer as the first terpolymer of ethylene, acrylic or methacrylic ester and maleic anhydride having a maleic anhydride content of at least 2% by weight. Preferably, the amine-terminated polyamide is a co-polyamide. The fibre, yarn or textile may also comprise fatty acid monoglyceride as set out hereinbefore.

The polymer compositions used in the fibres of the invention may optionally also contain from about 0.01 to about 10%, such as from about 0.025 to about 5% by weight of further additives, such as stabilizer co-additives and the like and mixtures of such additives.

Additives may be antioxidants, basic co-stabilizers, nucleating agents (such as talc, metal oxides) organic compounds such as mono- or poly-carboxylic acids and the salts thereof, fillers and reinforcing agents (for example calcium carbonate, silicates, glass fibres, glass beads, asbestos, talc, kaolin, mica, barium sulfate, metal oxides and hydroxides, carbon black, graphite, wood flour and flours or fibres of other natural products, synthetic fibres, dispersing agents, such as polyethylene oxide waxes or mineral oil, plasticisers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, clarifiers, UV absorbers, blowing agents and the like.

The invention relates to methods and compositions for modification of polypropylene-based compositions for use in fibres for use in yarns, fabrics, textiles or garments and to compositions for use in such methods. The compositions are suitable for blending with polypropylene prior to fibre formation and, when used with the methods of the invention, enable the resulting polypropylene based fibres to be dyed with dispersion dyes to provide fibres with high colour intensity (deep hues) and high dye substantivity and colour fastness without the need to employ temperatures in excess of the atmospheric pressure boiling point of the dye dispersion in aqueous solution.

The fibres of this invention are useful in staple fibres, continuous filament yarns, texturized filament yarns, ribbon material, fibrillated ribbons, films, nonwovens, woven and knitted fabrics, needled felt, woven and tufted carpets, woven garments, furniture and automobile upholstery, woven industrial fabrics, non-woven absorbents used in disposable diapers, non-woven garments including disposable medical garments, filter media, synthetic paper and the like.

Dyeable or dyed textiles, prepared from the fibres of the present invention, may include woven garments (outerwear and underwear), carpeting, furniture and automobile upholstery, woven industrial fabrics; non-woven absorbents used in diapers, sanitary pads, incontinence pads, wet and dry wipes, wound dressings, spill abatement and medical absorbent pads; non-woven garments such as disposable medical garments, felts or batts, pressed sheets, geo-textiles, filters, packaging materials, and synthetic paper.

The polypropylene compositions according to the invention have a good affinity for a disperse dyes and can be dyed and printed by means of techniques known in the art.

Dyeing and printing may be carried out on the fibres themselves, or on yarns, woven or knitted textile, non-woven textile, tufted carpets, needled felt and the like.

Polypropylene-based woven and nonwoven fibres and textiles, prepared according to the present invention also exhibit printability by disperse dye-based inks. As a result of their inherent hydrophobic nature, polypropylene-based fibres and textiles have, in the prior art, exhibited problems regarding printability. The present invention provides fibres and textiles rendered capable of being printed using disperse dyes to provide coloured articles exhibiting deep hues and low dye transfer characteristics.

EXAMPLE

A specific embodiment of the present invention will now be described, by way of example only.

Polypropylene fibres according to a first embodiment of the invention were prepared by initially preparing a masterbatch containing 5 parts by weight of Lotader™5500 (obtained from Arkema, 2.8% maleic anhydride and Melt Flow Index of 20 g/10 min. at 190° C., 2.16 kg with a molecular weight of about 5500) with 3 parts by weight of Platamid™ M1276 (obtained from Arkema, melting point 110° C. and Melt Flow Index of 6 g/10 min. at 190° C., 2.16 kg with a molecular weight of about 1300) in combination with 0.04 parts by weight of a glycerol monostearate. The weight ratio of terpolymer to amine-terminated polyamide was 1.66:1.

An industrial single screw extruder was fed with 3% by weight of the masterbatch and 97% by weight of a fibre grade polypropylene with a Melt Flow Index of 25 g/10 min. at 190° C., 2.16 k. Extrusion was carried out to produce a yarn with 105 tri-lobal filaments with the filaments having a decitex value of 11.9, yielding a total value for the yarn of 1250 decitex.

A dye bath was prepared, consisting of 400 ml water, acidified with ethanoic acid to a pH value from 3.5 to 3.8 and including 2 g/liter of a commercial surfactant dispersing agent, namely Nuosperse™ FA 196 obtained from Elementis Specialities, Inc. 5 g of the yarn was added and then the bath was heated to 70° C., and 0.05 g of disperse dye Dianix™ Blue AC-E (obtained from DyStar™) was added. The bath was heated further to 100° C., for 25 minutes under agitation, and then the yarn was removed and rinsed using a reductive solution of 2 g/l sodium hyposulphite ($Na_2S_2O_4$) at room temperature (25° C.). The fibres were then rinsed in water. The yarn achieved a deeply hued colour and was found to be resistant to dye transfer and dye loss when washed in the presence of a cotton test-cloth.

It will be appreciated that numerous modifications to the above described embodiment may be made without departing from the scope of the invention as defined in the appended claims.

The described and illustrated embodiment is to be considered as illustrative and not restrictive in character, it being understood that only a particular embodiment has been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A process for preparing dyed polypropylene-based fibres, the process comprising:
   i) blending a polypropylene having a Melt Flow Index of 45 g/10 min. or less at 190° C., 2.16 kg with an additive blend to provide a polymer composition, wherein the additive blend consists essentially of:
      a terpolymer selected from: a first terpolymer of ethylene, acrylic or methacrylic ester and maleic anhydride having a maleic anhydride content of at least 2% by weight, a second terpolymer of ethylene, acrylic or methacrylic ester and glycidyl methacrylate having a glycidyl methacrylate content of at least 7% by weight, and mixtures thereof, wherein the terpolymer has a Melt Flow Index of 30 g/10 min. or less at 190° C., 2.16 kg, and
      an amine-terminated copolyamide having a Melt Flow Index of 30 g/10 min. or less at 190° C., 2.16 kg,
      wherein the weight ratio of terpolymer to amine-terminated copolyamide in the additive blend is from 2:1 to 1:1, and
      wherein the polymer composition comprises from 1% to 10% by weight of the additive blend and from 85% to 99% by weight of the polypropylene,
   ii) forming polypropylene-based fibres from the polymer composition, and
   iii) dyeing the polypropylene-based fibres by contacting the fibres with an aqueous dispersion of a disperse dye.

2. A process according to claim 1 wherein the additive blend is provided in a masterbatch composition, the masterbatch composition being in the form of solid pellets, and the solid pellets of masterbatch composition are blended with the polypropylene, also in the form of solid pellets, to provide the polymer composition prior to forming the polypropylene-based fibres from the polymer composition.

3. A process according to claim 1 wherein the terpolymer is the first terpolymer of ethylene, acrylic or methacrylic ester and maleic anhydride having a maleic anhydride content of at least 2% by weight.

4. A process according to claim 1 wherein the dyeing of the polypropylene-based fibres is carried out under atmospheric pressure.

5. A masterbatch composition for use with a polypropylene having a Melt Flow Index of 45 g/10 min. or less at 190° C., 2.16 kg, the masterbatch composition comprising:
   an additive blend consisting essentially of:
      a terpolymer having a Melt Flow Index of 30 g/10 min. or less at 190° C., 2.16 kg selected from: a first terpolymer of ethylene, acrylic or methacrylic ester and maleic anhydride having a maleic anhydride content of at least 2% by weight, a second terpolymer of ethylene, acrylic or methacrylic ester and glycidyl methacrylate having a glycidyl methacrylate content of at least 7% by weight, and mixtures thereof, and
      an amine-terminated copolyamide having a Melt Flow Index of 30 g/10 min. or less at 190° C., 2.16 kg,
      wherein the weight ratio of terpolymer to copolyamide in the additive blend is from 2:1 to 1:1.

6. A masterbatch composition according to claim 5 wherein the masterbatch composition further comprises from 0.3 to 1% by weight of a fatty acid monoglyceride, wherein the fatty acid is selected from C12 to C18 saturated or unsaturated fatty acids and mixtures thereof.

7. A masterbatch composition according to claim 6 wherein the fatty acid monoglyceride comprises at least 60% by weight of glycerol monostearate.

8. A masterbatch composition according to claim 5 wherein the terpolymer is the first terpolymer of ethylene, acrylic or methacrylic ester and maleic anhydride having a maleic anhydride content of at least 2% by weight.

9. The masterbatch composition of claim 5, further comprising:
   a carrier miscible with polypropylene.

10. A process for preparing polypropylene-based fibres that are dyeable when the polypropylene-based fibres are contacted with an aqueous dispersion of a disperse dye under atmospheric pressure, the process comprising:
   providing an additive blend consisting essentially of
      a terpolymer selected from: a first terpolymer of ethylene, acrylic or methacrylic ester and maleic anhydride having a maleic anhydride content of at least 2% by weight, a second terpolymer of ethylene, acrylic or methacrylic ester and glycidyl methacrylate having a glycidyl methacrylate content of at least 7% by weight, and mixtures thereof, wherein the terpolymer has a Melt Flow Index of 30 g/10 min. or less at 190° C., 2.16 kg, and
      an amine-terminated copolyamide having a Melt Flow Index of 30 g/10 min. or less at 190° C., 2.16 kg, wherein the weight ratio of terpolymer to amine-terminated copolyamide in the additive blend is from 2:1 to 1:1;

blending the additive blend with a polypropylene having a Melt Flow Index of 45 g/10 min. or less at 190° C., 2.16 kg to provide a polymer composition, wherein the polymer composition comprises from 1% to 10% by weight of the additive blend and from 85% to 99% by weight of the polypropylene, and forming the polypropylene-based fibres from the polymer composition.

11. The process of claim 10 wherein:

the terpolymer is the first terpolymer of ethylene, acrylic or methacrylic ester and maleic anhydride having a maleic anhydride content of at least 2% by weight.

12. A polypropylene-based fibre, yarn or textile comprising:

from 85% to 99% by weight of a polypropylene having a Melt Flow Index of 45 g/10 min. or less at 190° C., 2.16 kg; and from 1 to 10% of an additive blend consisting essentially of:

a terpolymer selected from: a first terpolymer of ethylene, acrylic or methacrylic ester and maleic anhydride having a maleic anhydride content of at least 2% by weight, a second terpolymer of ethylene, acrylic or methacrylic ester and glycidyl methacrylate having a glycidyl methacrylate content of at least 7% by weight, and mixtures thereof, wherein the terpolymer has a Melt Flow Index of 30 g/10 min. or less at 190° C., 2.16 kg, and an amine-terminated copolyamide having a Melt Flow Index of 30 g/10 min. or less at 190° C., 2.16 kg, wherein the weight ratio of terpolymer to amine-terminated polyamide in the additive blend is from 2:1 to 1:1.

13. A polypropylene-based fibre, yarn or textile according to claim 12, wherein:

the terpolymer is the first terpolymer of ethylene, acrylic or methacrylic ester and maleic anhydride having a maleic anhydride content of at least 2% by weight.

14. A masterbatch composition for use with a polypropylene having a Melt Flow Index of 45 g/10 min. or less at 190° C., 2.16 kg, the masterbatch composition comprising:

an additive blend consisting essentially of:

a terpolymer having a Melt Flow Index of 30 g/10 min. or less at 190° C., 2.16 kg selected from: a first terpolymer of ethylene, acrylic or methacrylic ester and maleic anhydride having a maleic anhydride content of at least 2% by weight, a second terpolymer of ethylene, acrylic or methacrylic ester and glycidyl methacrylate having a glycidyl methacrylate content of at least 7% by weight, and mixtures thereof, and an amine-terminated copolyamide having a Melt Flow Index of 30 g/10 min. or less at 190° C., 2.16 kg, from 0.3 to 1% by weight of a fatty acid monoglyceride, wherein the fatty acid is selected from C12 to C18 saturated or unsaturated fatty acids and mixtures thereof, wherein the weight ratio of terpolymer to copolyamide in the additive blend is from 3:1 to 1:1.

15. The masterbatch composition according to claim 14 wherein the fatty acid monoglyceride comprises at least 60% by weight of glycerol monostearate.

16. The masterbatch composition of claim 14, further comprising:

a carrier miscible with polypropylene.

17. The masterbatch composition according to claim 14 wherein the terpolymer is the first terpolymer of ethylene, acrylic or methacrylic ester and maleic anhydride having a maleic anhydride content of at least 2% by weight.

* * * * *